United States Patent Office 3,351,663
Patented Nov. 7, 1967

3,351,663
HIGH ENERGY OXIDIZERS
Donald A. Guthrie, Cranford, N.J., assignor to Esso Research and Engineering Company, a corporation of Delaware
No Drawing. Filed June 14, 1960, Ser. No. 36,701
8 Claims. (Cl. 260—583)

The present invention relates to novel oxidizers and the preparation thereof. More specifically it concerns oxidizers which contain both $NF_2$ and $NO_2$ groups. One aspect of the invention relates to the preparation of these oxidizers by reacting an unsaturated compound containing at least one difluoroamino radical with nitrogen dioxide, nitrogen tetroxide or a mixture thereof. Another aspect of the invention concerns introducing nitro radicals into polymers that have at least one difluoroamino radical. Still another aspect of the invention relates to solid rocket propellants containing said oxidizers.

It is well known that it is advantageous to use oxidizers rich in difluoroamino radicals in pure rocket propellants because of their high energy. They are particularly valuable when used with boron fuels. However, considerable difficulty has been encountered in attempts to prepare organic compounds and polymers that contain a high ratio of $NF_2$ radicals per carbon atom due to the fact that the addition of $NF_2$ is not easily controlled and sometimes results in an explosion. Moreover, the lower molecular weight difluoroamino-substituted hydrocarbons are relatively volatile and may evaporate on storage of the propellant. Various methods have been investigated to find a way of improving the oxidation properties of unsaturated organic substances that are partially saturated with $NF_2$ groups.

It has now been discovered that nitro radicals can readily be introduced into unsaturated difluoroamino compounds and polymers. The novel compounds produced, which contain a minimum of one nitro radical and one difluoroamino radical, are strong oxidizers. Moreover, the lower molecular weight oxidizers are higher boiling than their corresponding difluoroamino compounds, i.e. compounds containing as many $NF_2$ groups as the total number of both $NF_2$ and $NO_2$ groups in the oxidizers of the present invention. Thus evaporation losses are minimized.

It was surprising to find that nitro radicals could be added to unsaturated compounds already containing the highly reactive and energetic difluoroamino groups without causing decomposition or rearrangement of these groups. For example, great difficulty has been encountered in effecting the reverse of this process, namely the addition of $NF_2$ groups to a nitro olefin by reaction with tetrafluorohydrazine ($N_2F_4$). The principal products of these attempts have been $N_2$, CO, HF and other decomposition products.

The products have unusual impact stability and are useful not only in rocket propellants as binders and oxidizers but also in sundry chemical oxidation processes as well as detonators or explosives. Since these mixed $NF_2$-$NO_2$ oxidizers have different solubility characteristics than the $NF_2$ compounds they are compatible with propellant ingredients not suitable for use with the latter class of compounds.

In carrying out the present invention, an unsaturated difluoroamino reactant, e.g. the addition product of $N_2F_4$ and a hydrocarbon, is contacted with nitrogen dioxide and/or its dimer at temperatures of about $-70°$ to $100°$ C. under subatmospheric, e.g. 0.1 atmosphere, to superatmospheric, e.g. 10 atmospheres, pressures for from a few minutes to 1 day or more. The addition reaction can effectively be carried out at $0°$ to $40°$ C. under substantially atmospheric pressure, and therefore these conditions are preferred mainly because of their economical attractiveness. The process, which may be carried out batchwise or continuously, can be carried out in either a mixed or a single phase since the organic reactant is usually a liquid and the nitrogen oxide reactant is either a gas or a liquid under the selected reaction conditions. Inert solvents or diluents may be employed if the organic reactant is a solid or a viscous liquid.

The nitrogen dioxide or its dimer should be essentially free of any interfering substances. The amount of nitrogen oxide used is usually in excess of the stoichiometric quantity needed to produce the desired oxidizer. It is understood, of course, that less than stoichiometric amounts of the nitrogen oxide reactant may be utilized where it is advantageous to react only a portion of the organic compound. In general, the molar ratio of nitrogen dioxide to the organic reactant should be in the range of about 0.1 to 10:1, although for most purposes molar ratios of 1 to 4:1 are most suitable. The latter molar ratio range is particularly applicable to those processes in which it is desirable to introduce at least one nitro radical into each mole of the organic reactant.

The unsaturated organic reactant must contain at least one double bond and one difluoroamino radical. Most reactants contain 2 or more difluoroamino radicals since they add across double bonds, i.e. two radicals add per double bond. Of course, it can have numerous double bonds, e.g. polybutadiene, and contain up to one difluoroamino radical per carbon atom. In fact, where the oxidizer is intended for use in a rocket propellant, the organic reactant should contain about 0.3 to 1 difluoroamino radical per carbon atom.

Among the suitable lower molecular weight reactants which have this high ratio of difluoroamino radicals to carbon atoms are compounds having up to 8 carbon atoms, e.g. allyl difluoroamine, 1,4- and 1,2-bis(difluoroamino) - butenes, 5,6-bis(difluoroamino)-hexene-1 and 4,5 - bis(difluoroamino)-pentene-1. The preferred lower molecular weight aliphatic difluoroamino organic compounds have a total carbon content of 3 to 6 carbon atoms per molecule.

The higher molecular weight difluoroamino organic reactants are polymers to which one or more difluoroamino groups have been added. Most of the polymers are resinous or rubbery hydrocarbons, although some contain halogen atoms, e.g. polychloroprene. They all have a carbon-carbon backbone and sufficient unsaturation to permit the addition of at least one nitro radical per molecule. Generally speaking the polymers have a number average molecular weight of from 800 to 2,000,000 or more and contain at least about 25 wt. percent difluoroamino radicals. The preferred polymer reactants contain about 40 to 60 wt. percent difluoroamino radicals and a considerable number of internal or pendant double bonds, e.g. 1 double bond per 4 to 6 carbon atoms in the molecule. Among the difluoroamino homo- and copolymers which may be used to prepare the novel oxidizers of the present invention are polybutadiene resin, butadiene-styrene resin, polybutadiene rubber, polyisoprene rubber, polychloroprene rubber, polymethylpentadiene, natural rubber, styrene-butadiene rubber, isoprene-isobutylene rubber (butyl rubber) and polyhexadiene, all of which have been previously treated with substantially pure tetrafluorohydrazine. The preferred polymers are the polybutadienes and polyisoprenes because of their high unsaturation.

The difluoroamino polymers may be prepared by dissolving or admixing the polymer with a hydrocarbon or chlorinated liquid solvent, such as hexane, benzene or carbon tetrachloride, to make a pumpable solution of the polymer. The maximum concentration of the polymer in the solvent will depend upon the molecular weight of the polymer. For instance, a 50 wt. percent solution of a low molecular weight polymer may be reacted with tetrafluorohydrazine, while on the other hand, it may be possible to use only a very dilute solution of the polymer, e.g. 1 wt. percent, if it has a very high molecular weight. The addition of the difluoroamino groups to the polymer may be effected at temperatures ranging from room temperature to 100° C. under tetrafluorohydrazine pressures of 1 atmosphere to 25 atmospheres for periods of time ranging from a few hours to several days. It is generally advisable to use a large excess of tetrafluorohydrazine so that there is at least 5 moles of tetrafluorohydrazine per double bond in each molecule of the polymer present in the reaction zone. The monomer used in the preparation of the polymer is preferably a $C_4$ to $C_6$ conjugated diolefin, such as butadiene or isoprene.

The addition of nitro radicals to the difluoroamino substance is preferably carried out in an inert atmosphere and a glass or stainless steel reactor. While no catalyst is necessary for the reaction, it is sometimes advantageous to use ionizing radiation, e.g. a dose of 1 to 10 mr. or ultraviolet light to stimulate the reaction and thereby shorten the time. It is also advantageous to agitate the reaction mixture by shaking or stirring it in order to facilitate the contact of the reactants with each other. As mentioned above, the nitro radicals must be added to compounds or polymer which contain $NF_2$ radicals, that is to say, the $NF_2$ groups cannot be added to a substance containing nitro groups because the $N_2F_4$ reactant would decompose under these conditions. Moreover, the two radicals cannot be simultaneously added to the unsaturated compound for the same reason.

A diluent is optional and is usually employed only when the difluoroamino compound is a high molecular weight substance. In such cases, hydrocarbon diluents, such as hexane, heptane or cyclohexane may be used. Aside from the hydrocarbon diluents, nitromethane, chloroform and carbon tetrachloride have been found to be useful. The nature of the diluent is not particularly important provided it is inert and makes a suitable medium for the reaction. The concentration of difluoroamino reactant in the diluent will depend to a large extent on the molecular weight of the compound. In most instances, the concentration of organic reactant in the diluent will be within the range of 5 to 50 wt. percent. The atmosphere of the reaction zone is generally occupied by nitrogen dioxide or its dimer, although in some instances it may be desirable to dilute the nitrogen dioxide with nitrogen, helium or carbon dioxide.

Upon completion of the reaction, the products may be recovered by distillation or flashing. The unreacted nitrogen dioxide and/or nitrogen tetroxide gas may be recovered in a cold trap and recycled to the reaction zone. The unreacted, unsaturated organic substances may be separated from the product by simple or fractional distillation. The lighter unsaturated substances are withdrawn overhead and may also be recycled to the reaction zone. The residue may be washed with a dilute hydrochloric acid solution to remove any nitrites or nitrates that may be present and dried.

If the product is a high molecular weight solid, it should contain at least 1 wt. percent $NO_2$ radicals and preferably contains 10 to 20 wt. percent of such radicals. The polymer may be used as a binder-oxidizer in a solid rocket propellant in which boron is a fuel. Generally at least 5 wt. percent and up to 30 or 50 wt. percent of the modified polymers are used in the propellant. If it is a lower molecular weight liquid product containing 1 or 2 difluoroamino radicals and 2 nitro radicals, it may be used as an oxidizer by mixing it with a suitable solid fuel in accordance with the following recipe.

| Ingredient: | Wt. percent |
| --- | --- |
| Boron | 2.16 |
| 1,2-bis(difluoroamino)-3,4-dinitrobutane | 83.90 |
| Polyisoprene or natural rubber | 13.94 |

The amount of the low molecular weight material used in the propellant will of course vary with the other ingredients, but usually it occupies between 10 and 90 wt. percent of the propellant.

The preferred novel aliphatic saturated lower molecular weight oxidizers prepared in accordance with the present invention have the following general formula:

$$C_nH_{(2n-x-y+2)}(NO_2)_x(NF_2)_y$$

wherein $n$ is an integer of 3 to 6; $x$ is an even integer of 2 to 4; and $y$ is an integer of 1 to 4.

The following examples are given to provide a better understanding of the invention:

Example 1

A mixture of bis-(difluoroamino)-butenes, which was prepared by reacting butadiene-1,3 with tetrafluorohydrazine at 23° C. for 120 hours under ⅓ atmosphere of pressure of $N_2F_4$, was introduced into a 50 ml. glass vessel which was then swept with nitrogen dioxide to remove any air originally present in the vessel and to saturate the liquid adducts. Thereafter nitrogen dioxide was introduced into the vessel which was at room temperature until a pressure of about 1 atmosphere was obtained. The gaseous reactant comprised an equilibrium mixture of nitrogen dioxide and nitrogen tetroxide. After the mixture had been allowed to stand at room temperature for 3 hours the excess nitrogen dioxide was purged from the system and the remaining liquid was analyzed by gas chromatography (G.C.) and its composition was compared with that of the initial feed. These data are summarized in the following table:

ANALYSIS OF FEED AND PRODUCT BY GAS CHROMATOGRAPHY

| Compounds in Feed | Retention Time Relative to Benzene | Composition, Percent of Total Sample | | Percent Conv. |
| --- | --- | --- | --- | --- |
| | | Feed | After Nitrogen Dioxide Treatment | |
| 1,2-bis(difluoroamino)-butene-3 | 0.91 | 29.1 | 0 | 10 |
| 1,4-bis(difluoroamino)-butene-2 (low B.P.) | *1.90 | 9.2 | 4.9 | 4 |
| 1,4-bis(difluoroamino)-butene-2 (high B.P.) | *2.24 | 61.7 | 40.7 | 3 |

* These are cis-trans isomers differing in boiling point and therefore G.C. retention time.

The feed and product were analyzed by passing a 2 microliter sample through a Perkin and Elmer gas chromatograph (model 154) having a 2 liter silicone oil on celite column at 75° C. under a pressure of about 1.3 atmospheres of helium. The data in the above table show that over 50 wt. percent of the feed reacted with nitrogen dioxide to produce oxidizers having both difluoroamino and nitro radicals. It should be noted that the 1,2-bis-isomer reacts much faster than either the cis or trans-1,4-bis-adducts (100% conversion in 3 hours v. only 34 to 46% conversion respectively). No other light products or heavier ones up to a relative retention time of 130 were found in the analysis which is interpreted to mean that substantially no decomposition or side reactions occurred while the process was being carried out. The dinitro compounds prepared above were highly polar and had very high boiling points. Therefore they would not be expected to appear on a silicone G.C. column run at 75° C. The rate of addition of nitrogen tetroxide to the butadiene adducts was comparable to the rates for bromine addition. Thus, the nitro groups readily added to the double bonds in the $C_4$ olefin.

The liquid product was further characterized by distilling the unreacted 1,4-bis(difluoroamino)-butene-2 compounds out of the liquid reaction mixture under .1 mm. of mercury pressure. The unreacted feed was recovered in a liquid nitrogen trap and analyzed in an infrared instrument. The infrared data showed that the overhead product trapped by the liquid nitrogen comprised a mixture of 1,4-bis-adducts and some nitrogen dioxide substituted impurities.

The residual oily high boiling liquid in the distillation flask was also analyzed in an infrared instrument and found to consist of a mixture of difluoroamino-dinitrobutanes. There were very strong bands at 6.0, 6.2, 6.5 and 7.4 microns indicating that there were a substantial number of nitro groups in the product. The absence of bands at 10.1, 10.4 and 11.0 microns showed that there was very little unsaturation. Moreover, there was evidence of hydrogen bonding at 3.0 microns suggesting either that the nitro groups were in their acid form or that some "OH" by-products had formed. There was no loss of the original difluoroamine bands at 11.7 and 12.3 microns. The residual liquid was relatively insoluble in carbon tetrachloride and hexane and its density was about 1.59 grams per cc. at 20° C. Its impact sensitivity was between 1.5 and 2 kg. in (RDX=20 kg. in.).

The liquid product was analyzed for nitrogen and fluorine in a nuclear magnetic resonance instrument and it was found that the residual liquid contained 36.5% fluorine. The fluorine analysis was checked by hydrolyzing and titrating the sample. The fluorine chemical analysis showed that there was 35.5% fluorine present. A Dumas nitrogen determination showed 20.83% N. The theoretical amounts of nitrogen and fluorine in the various isomers of difluoroamino-dinitrobutane are 22.4% nitrogen and 30.4% fluorine. The nitrogen and fluorine analyses indicate that the residual liquid product contained about 33 to 34% unreacted bis-(difluoroamino)-butene adduct.

*Example 2*

Example 1 was repeated using essentially pure 1,4-bis-(difluoroamino)-butene-2- isomers. The feed which comprised 90.7 wt. percent of the high boiling point isomer and 7.6 wt. percent of the low boiling point isomer (total weight equaled 0.0591 g.) was reacted with 0.1261 gram of a mixture of nitrogen dioxide and nitrogen tetroxide under 1 atmosphere pressure. The mole ratio of butene feed to nitrogen tetroxide was 1:3.7. The reaction mixture was allowed to stand at room temperature for 22 hours and thereafter the nitrogen tetroxide and some unreacted feed were released from the reaction vessel and trapped out with liquid nitrogen. The residual liquid was quantitatively analyzed in a nuclear magnetic resonance instrument and it was found that the sample contained 36.7% fluorine. The liquid product was also analyzed in a gas chromatograph comprising a 2 ft. column filled with chlorinated-fluorinated wax on a support at 114° C. under 5 p.s.i.g. of helium pressure. It was found that about 12 wt. percent of the liquid product consisted of unreacted feed (retention time relative to n-nonane of 0.90). However, the compounds which had a retention time relative to n-nonane of 6.05 and 8.24 were the expected meso and d,l-dinitro derivatives. These latter compounds represent over 75 wt. percent of the product.

The liquid residual product was washed with n-hexane and then dried under vacuum. A nitrogen analysis showed that it contained 22.6% of that element as compared with a theoretical nitrogen content of 22.4% for 1,4-bis(difluoroamino)-2,3-dinitrobutane. The foregoing shows that the product can be easily purified by extracting the impurities with a liquid hydrocarbon.

A high resolution nuclear magnetic resonance analysis of another portion of the residual liquid product (the same as evaluated on the gas chromatograph) showed that the mixture contained only primary difluoroamino groups as evidenced by peaks at 5380 cycles. Thus, there was no shifting of the difluoroamino groups during the reaction.

*Example 3*

In a similar manner 0.1 g. of 1,2-bis(difluoroamino)-pentene-4 is reacted for 24 hours with an excess (0.30 g.) of $N_2O_4$. After this time essentially complete conversion to 1,2-bis(difluoroamino)-4,5-dinitropentane is obtained. Nitrogen and fluorine analyses are consistent with this structure and nuclear magnetic resonance analysis shows the presence of equal amounts of primary and secondary difluoramino groups.

*Example 4*

As mentioned above, when unsaturated polymers are treated with tetrafluorohydrazine at room temperature to 100° C. under pressures of up to 450 p.s.i., it is difficult to saturate more than 75% of the double bonds in the polymer with difluoroamino radicals. In accordance with one embodiment of the invention the remaining double bonds are reacted with nitrogen dioxide or its dimer to produce a polymeric binder for rocket propellants which contains a higher oxidizer content, i.e., numerous nitro radicals in addition to the difluoroamino radicals. The sensitivity of the mixed products of the present invention is less than that of a similar product saturated to the same extent with difluoroamino radicals alone.

Polybutadiene having a viscosity average molecular weight of about 5000 and containing 50% of its double bonds in the form of side vinyl groups and 50% as internal double bonds, was reacted with tetrafluorohydrazine by irradiation at 23° C. with $Co^{60}$ under 27 atmospheres pressure for about 16.6 hours. The total radiation dose was $30.0 \times 10^6$ rads. Prior to introducing the polymer into the reaction zone it was diluted with chloroform to produce a 24.3 wt. percent solution. After venting the excess tetrafluorohydrazine and the solvent at the end of the reaction it was found that only 27.5% of the initial double bonds were saturated with difluoroamino radicals. The modified polymer contained 9.34% nitrogen which is equivalent to 34.7 wt. percent difluoroamine.

This modified polymer was then admixed with nitromethane until the final mixture consisted of 2.5857 grams of nitromethane and 0.200 gram of the modified polymer. The polymer did not dissolve in the nitromethane but rather formed a soft gel. Nitrogen dioxide was then introduced into the reaction zone, which was at room temperature, after the zone had been swept free of air by degasing the solvent and polymer by alternate freezing and thawing with pumping. The polymer-solvent mixture and 50 cc. of vapor space above it were saturated with nitrogen dioxide and its dimer and allowed to stand for 22 hours at room temperature (23° C.). At the end of this time the excess nitrogen dioxide and its dimer were pumped out of the reaction zone together with the solvent. The recovered polymer was dried under vacuum and analyzed for nitrogen. The analytical results show that it contained 12.59 wt. percent nitrogen which meant that it contained 29.4 wt. percent difluoroamino radicals and 15.4 wt. percent nitro radicals and that 44% of the double bonds initially present had been saturated. The hard, rubbery, yellow-orange polymer had a sensitivity of 15 kg. inches and ignited without producing any noise or smoke. On the other hand, when 44% of the double bonds in this polymer are saturated with difluoroamine groups only, the product has a sensitivity of 6–10 kg. inches. Its density was 1.30 g./cc. Infrared examination of the product as a mull in mineral oil showed the presence of strong nitro bands at 6.0, 6.2 and 6.5 microns as well as $NF_2$ bands at 11.7 and 12.3 microns. The latter were equal in intensity to those of the modified polymer before treatment with $N_2O_4$.

*Example 5*

In a similar manner, a depolymerized natural rubber of 3500 molecular weight was treated with tetrafluorohydrazine to give a modified polymer containing 30.2 wt. percent $N_2F_4$ and representing 29% saturation of the initial double bonds of the natural rubber. This product (0.1093 g.) was dissolved in 36 grams of chloroform and this solution was treated with a large excess of nitrogen dioxide at room temperature (23° C.) for 65 hours. An insoluble yellow polymer separated (0.0568 g.) from the solution. This was soluble in acetone. Analysis of the dried polymer showed 10.50% N and 17.7% F representing a fraction containing 24.2% $NF_2$ groups and 13.1% $NO_2$ groups. Infrared analysis confirmed the presence of these groups.

The chloroform solution was evaporated and a residue comprising a yellow gum (0.0709 g.) containing 10.52% N and 21.2% F was recovered. The analyses represent a $NF_2$ content of 29.0% and a $NO_2$ content of 8.9%. Again infrared analysis confirmed the presence of both functional groups.

As shown in Example 4, ionizing radiation can be utilized to promote the $N_2F_4$ modification reaction, especially where low reaction temperatures are employed. Radiation doses of from about 0.1 to 30 mr. can be used with dose rates of $1 \times 10^4$ r./hr. to $10 \times 10^6$ r./hr. Among the types of radiation that are suitable are high energy electromagnetic radiations, such as gamma rays and X-rays. In general, high velocity electrons, high energy gamma rays and neutrons are preferred mainly because of the high penetrating power of these rays and/or availability and ease of application of these sources of energy. By high energy ionizing radiation is meant the radiation from terrestrial sources of sufficient energy that the dose rate is at least $1 \times 10^4$ r./hr. This excludes radiation such as cosmic and ultraviolet light which are ineffectual for the purposes of this invention. A suitable source of ionizing radiation is radioactive cobalt 60 which emits gamma rays.

It is not intended to restrict the present invention to the foregoing examples which are merely given to demonstrate some of the embodiments of the invention. It should only be limited to the appended claims in which it is intended to claim all of the novelty inherent in the invention as well as the modifications and equivalents coming within the scope and spirit of the invention.

What is claimed is:

1. A nitro radical adduct of a difluoroamino-substituted olefinic hydrocarbon selected from the group consisting of allyl difluoroamine, 1,4-bis(difluoroamino)-butene-2, 1,2-bis(difluoroamino)-butene-3, 4,5-bis(difluoroamino)-pentene-1, 5,6-bis(difluoroamino)-hexene-1, and difluoroamine adducts of polybutadiene, of polyisoprene, of polymethylpentadiene, and of polyhexadiene, said difluoroamino adducts containing 25 to 60 wt. percent of $NF_2$, an $NO_2$ radical being attached to each of 2 carbon atoms linked together by a double bond in said difluoroamino-substituted olefinic hydrocarbon.

2. 1,2-bis(difluoroamino)-3,4-dinitrobutane.

3. 1,4-bis(difluoroamino)-2,3-dinitrobutane.

4. Polybutadiene containing 40 to 60 wt. percent difluoroamino radicals and 10 to 20 wt. percent nitro radicals.

5. A conjugated $C_4$ to $C_6$ diolefin hydrocarbon polymer containing about 25 to 60 wt. percent difluoroamino radicals and about 10 to 20 wt. percent nitro radicals attached to carbon atoms having double bonds in said hydrocarbon polymer.

6. Process for preparing nitro radical adducts of a difluoroamino-substituted olefinic hydrocarbon selected from the group consisting of allyl difluoroamine, 1,4-bis(difluoroamino)-butene-2, 1,2-bis(difluoroamino)-butene-3, 4,5 - bis(difluoroamino) - pentene-1, 5,6-bis(difluoroamino)-hexene-1, and difluoroamine adducts of polybutadiene, of polyisoprene, of polymethylpentadiene, and of polyhexadiene, said difluoroamino adducts containing 25 to 60 wt. percent of $NF_2$, which comprises reacting the difluoroamino-substituted olefinic hydrocarbon with a nitrogen oxide selected from the group consisting of nitrogen dioxide, nitrogen tetroxide, and mixtures thereof at temperatures of $-70°$ to $100°$ C. under subatmospheric to superatmospheric pressure for a period of minutes to one day to add $NO_2$ radicals to double bonded carbon atoms in said difluoroamino-substituted olefinic hydrocarbon, and recovering resulting $NO_2$ adducts of the difluoroamino substituted olefinic hydrocarbon.

7. Process according to claim 6 in which the difluoroamine substituted olefinic hydrocarbon is 1,2-bis(difluoroamino)-butene-3.

8. Process according to claim 6 in which the difluoroamino-substituted olefinic hydrocarbon is the difluoroamine adduct of polybutadiene containing 25 to 60 wt. percent $NF_2$.

References Cited

UNITED STATES PATENTS

| | | | |
|---|---|---|---|
| 2,786,078 | 3/1957 | Sauer | 260—583 |
| 2,857,258 | 10/1958 | Thomas | 52—0.5 |
| 2,908,714 | 10/1959 | Shabica | 260—583 |
| 2,936,225 | 5/1960 | Linsk et al. | 52—0.5 |

JOSEPH L. SCHOFER, *Primary Examiner.*

R. L. CAMPBELL, L. D. ROSDAL, *Examiners.*

W. HAMROCK, B. R. PADGET, J. W. WHISLER,
*Assistant Examiners.*